United States Patent [19]
Schmitz

[11] Patent Number: 5,826,336
[45] Date of Patent: Oct. 27, 1998

[54] PROCESS FOR THE PRODUCTION OF SERIES-PRODUCED VALVES USED IN HEATING, VENTILATING AND AIR-CONDITIONING SYSTEMS

[75] Inventor: Manfred Schmitz, Essen, Germany

[73] Assignee: Johnson Service Company, Milwaukee, Wis.

[21] Appl. No.: 509,711

[22] Filed: Aug. 1, 1995

[30] Foreign Application Priority Data

Aug. 23, 1994 [DE] Germany ............ 44 29 804.8

[51] Int. Cl.⁶ .................................................. B21D 53/00
[52] U.S. Cl. ............................ 29/890.124; 29/890.31; 29/460; 228/165; 251/359
[58] Field of Search ............. 29/890.124, 890.131, 29/460, 890.12; 228/262.4, 165, 168; 251/359

[56] References Cited

U.S. PATENT DOCUMENTS

| | | | |
|---|---|---|---|
| 2,834,097 | 5/1958 | Eichenberg et al. | 29/890.131 |
| 3,379,410 | 4/1968 | Stewart, Jr. | 251/359 |
| 3,675,681 | 7/1972 | Obermaier | 137/625.3 |
| 3,777,342 | 12/1973 | Allen | 29/890.131 |
| 3,913,887 | 10/1975 | Siepmann . | |
| 4,542,879 | 9/1985 | Stein . | |
| 4,646,407 | 3/1987 | Mayhew, Jr. | 29/460 |
| 4,773,625 | 9/1988 | Calvin | 228/165 |
| 4,899,775 | 2/1990 | Calvin | 228/165 |
| 5,401,205 | 3/1995 | Shank, Jr. | 451/101 |
| 5,433,492 | 7/1995 | Glossop, Jr. | 294/65.5 |
| 5,573,345 | 11/1996 | Voss et al. | 228/165 |
| 5,577,322 | 11/1996 | Oshita et al. | 29/890.124 |
| 5,711,343 | 1/1998 | Beckett | 137/512.1 |

FOREIGN PATENT DOCUMENTS

| | | |
|---|---|---|
| 1014834 | 8/1952 | France . |
| 716 993 | 3/1942 | Germany . |
| 759 404 | 4/1953 | Germany . |
| 905 806 | 9/1954 | Germany . |
| PA 395286 | 11/1957 | Germany . |
| 1 775 879 | 5/1972 | Germany . |
| 25 19 883 | 11/1976 | Germany . |
| 28 40 618 | 3/1980 | Germany . |
| 30 23 475 a1 | 1/1982 | Germany . |
| 85 28 066.5 | 12/1985 | Germany . |
| 35 08 223 A1 | 10/1986 | Germany . |
| 35 09 352 A1 | 5/1987 | Germany . |
| 39 18 372 A1 | 2/1990 | Germany . |
| 40 03 227 C1 | 1/1991 | Germany . |
| 1-176871 (A) | 6/1989 | Japan . |
| 5-172291 | 7/1993 | Japan .................... 251/359 |
| 6-281021 | 10/1994 | Japan .................... 251/359 |

OTHER PUBLICATIONS

Metals Handbook, 8th Ed, vol. 6 "Welding and Brazing" Amer. Soc. for Wheels, 1971 pp. 148–151, Originally from Welding Handbook, 6th Ed. Sec.1, 1968.

Modern Welding Technology, Howard B. Gary Feb. 13, 1980 pp. 501–517.

*Primary Examiner*—Larry I. Schwartz
*Assistant Examiner*—Marc W. Butler
*Attorney, Agent, or Firm*—Quarles & Brady

[57] ABSTRACT

The invention relates to a process for the production of series-produced valves which are used in heating, ventilating and air-conditioning systems and which comprise a cast-iron valve body, at least one stainless steel valve seat disposed in a flow restrictor opening in the valve body and an actuating rod having at least one flow restrictor, the actuating rod being taken out of the valve through a cover which closes an opening for the cover in the valve body, such opening being in alignment with the valve seat. The valve seat is welded into a casting serving as blank for the valve body without previous chip removal treatment of the casting surface, in one chucking. The blank is then finish-treated. Preferably, the valve seat is produced by build-up welding followed by chip removal shaping of the weld bead.

10 Claims, 4 Drawing Sheets

PROCESS FOR THE PRODUCTION OF SERIES-PRODUCED VALVES USED IN HEATING, VENTILATING AND AIR-CONDITIONING SYSTEMS

DESCRIPTION

The invention relates to a process for the production of series-produced valves which are used in heating, ventilating and air-conditioning systems and which comprise a cast-iron valve body, at least one stainless steel valve seat disposed in a flow restrictor opening in the body and an actuating rod having at least one flow restrictor, the actuating rod being taken out of the valve through a cover which closes an opening for the cover in the valve body, such opening being in alignment with the valve seat. The series valves can be straight-through valves having an inlet and an outlet or multi-way valves. They are used for heating, ventilating and air-conditioning systems more particularly as water and steam valves in standard nominal widths and nominal pressure stages of up to a maximum of 40 bar. However, use as a gas valve is not excluded.

Series-produced valves for heating, ventilation and air-conditioning systems are produced in large batches. The aim is simple low-cost manufacture. It is known for the valve seat to be formed on a screwthreaded ring which is screwed into the flow restrictor opening in the valve body after the latter has been finish-treated. The known construction has a number of disadvantages. An opening for the cover of considerably larger diameter than the diameter of the flow restrictor is necessary to enable the screwthreaded ring to be introduced into the valve body. The cover, the associated flange on the valve body and the fixing screws must be made disproportionately large since the force exerted by the operating pressure is proportional to the cover area. The valve body must therefore have large dimensions and an increased amount of material is required. Also, contriving the screwthread for the fitting of the seat ring is complex from the production engineering point of view and the sealing of the external thread requires additional steps which increase production and assembly costs. Satisfactory sealing is not always ensured more particularly at high media temperatures. Misalignments between the seat ring and the valve body are unavoidable because of the necessary tolerances.

It is the object of the invention to disclose a process for the production of valves of the kind hereinbefore described which enables valve body size to be reduced for predetermined nominal widths and pressures, permits simple manufacture of the valve in a reduced number of treatment stages and improves the sealing tightness of the valves.

To this end, according to the invention, the valve seat is welded into the casting serving as blank without previous chip removal treatment of the casting surface, whereafter the blank is finish-treated in one chucking. Cast iron having lamellar graphite and cast iron having nodular graphite are preferred (DIN 1691 and DIN 1693 respectively). Cast bodies more particularly made to engineering standard give good results.

The process according to the invention is of use for producing straight-through valves and multi-way valves. In connection with the production of multi-way valves, in a further development of the invention a casting serving as a blank for the body is used which has two identical openings for the cover in alignment with one another. After the machining of the blank a cast-iron branch flange which also has a flow restrictor opening and a stainless steel welded-in valve seat is connected to one of the two openings for the cover. The complete machining of the branch flange can be carried out in the same machining station as the one in which the blank for the valve body is machined.

The embodiments of the process according to the invention described hereinafter for producing the valve seat apply both to the valve seat in the body blank and to the valve seat of the branch flange. In a first development of the process according to the invention a weld bead of a stainless material is introduced by build-up welding into an annular groove in the flow restrictor opening, such groove being open on the end face, and the valve seat is produced by shaping of the weld bead by chip removal. More particularly Capilla 51 MSG 8-GZ (1.4370) is suitable as a standard type of build-up material. A valve seat in the form of a seat edge produced in this way is free from cracks and pores and provides satisfactory sealing tightness. For more stringent requirements relating to differential pressures and corrosion resistance special hard and strong materials such as Stellite G can be used for the build-up. An additional build-up of defined thin layers of these materials or pure tempering of the finish-treated seat edge can also be provided.

In an alternative form of the process according to the invention a prefabricated stainless steel ring is welded into the flow restrictor opening, the ring having a seat edge serving as valve seat for the flow restrictor. This form of the process according to the invention is intended more particularly for series-produced valves of small nominal widths. The process previously described wherein the valve seat is produced by build-up welding is preferred for the production of series valves having relatively large nominal widths.

Various known welding processes can be used for the welding operations. Good results can be achieved if the welding operations are performed by pulsed arc welding in a protective gas, a gas mixture having argon as its main constituent and additions of $CO_2$ and oxygen having proved satisfactory as protective gas. Laser welds are also satisfactory.

The invention will be described hereinafter with reference to the diagrammatic drawings which illustrate just one embodiment and in which.

Figure 1B:
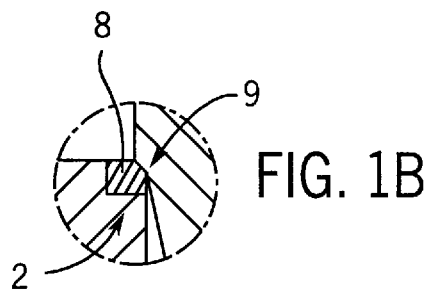
FIG. 1 is a view in longitudinal section through a straight-through valve produced by the process according to the invention.
Figure 1A:
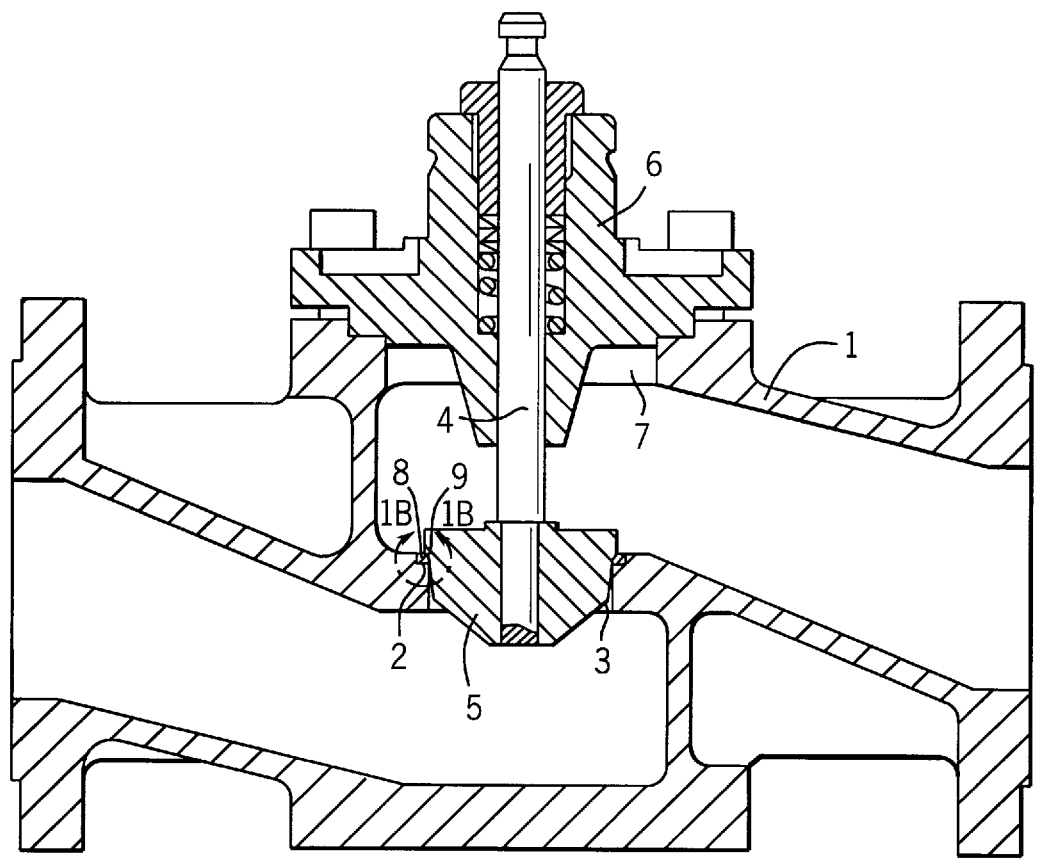
Figure 2A:
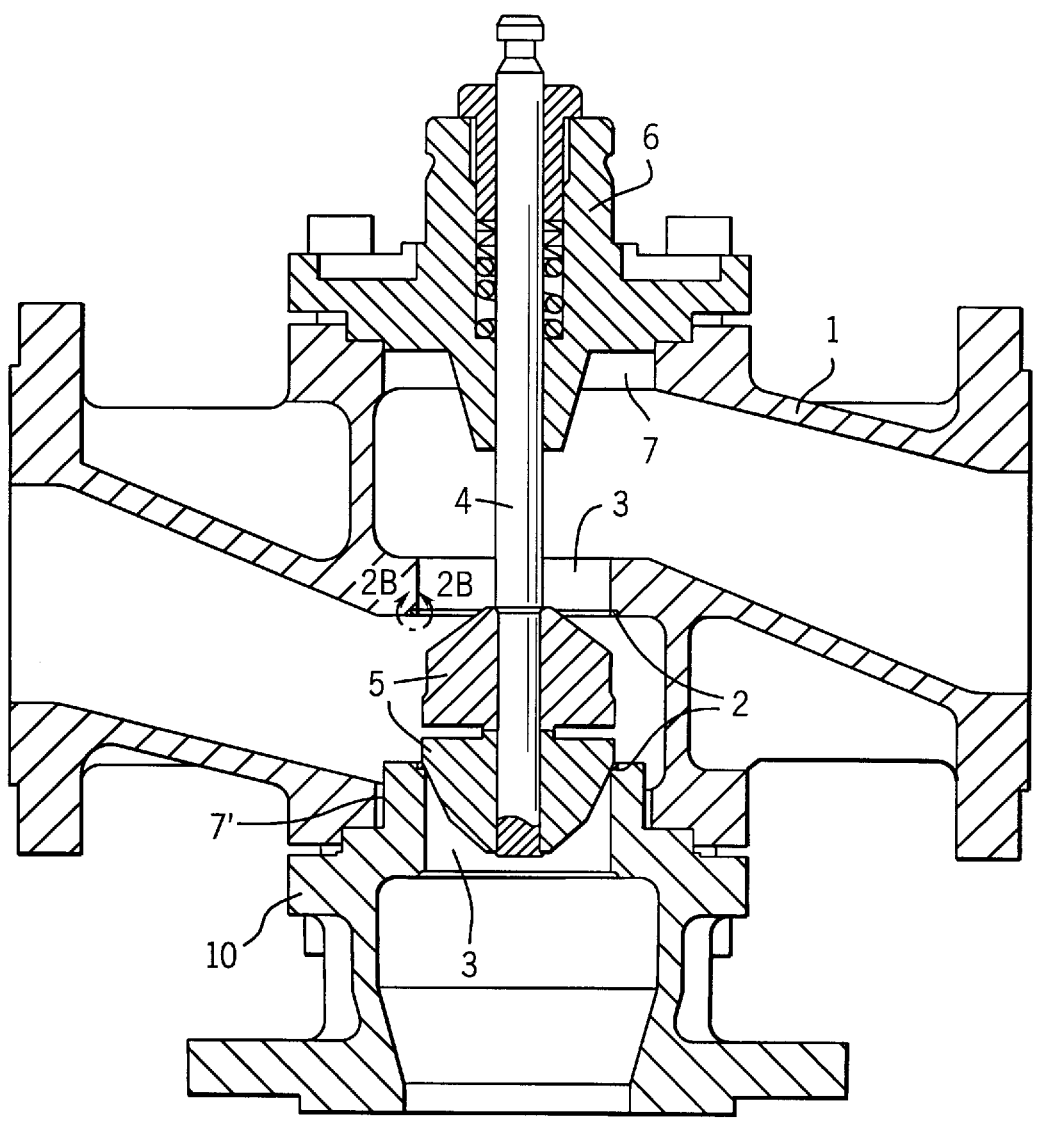
FIGS. 2 and 3 are longitudinal sections through various kinds of a multi-way valve produced by the process according to the invention.
Figure 2B:
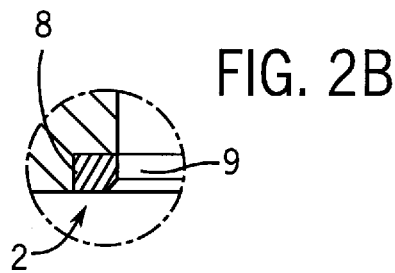
Figures 3A, 3B:
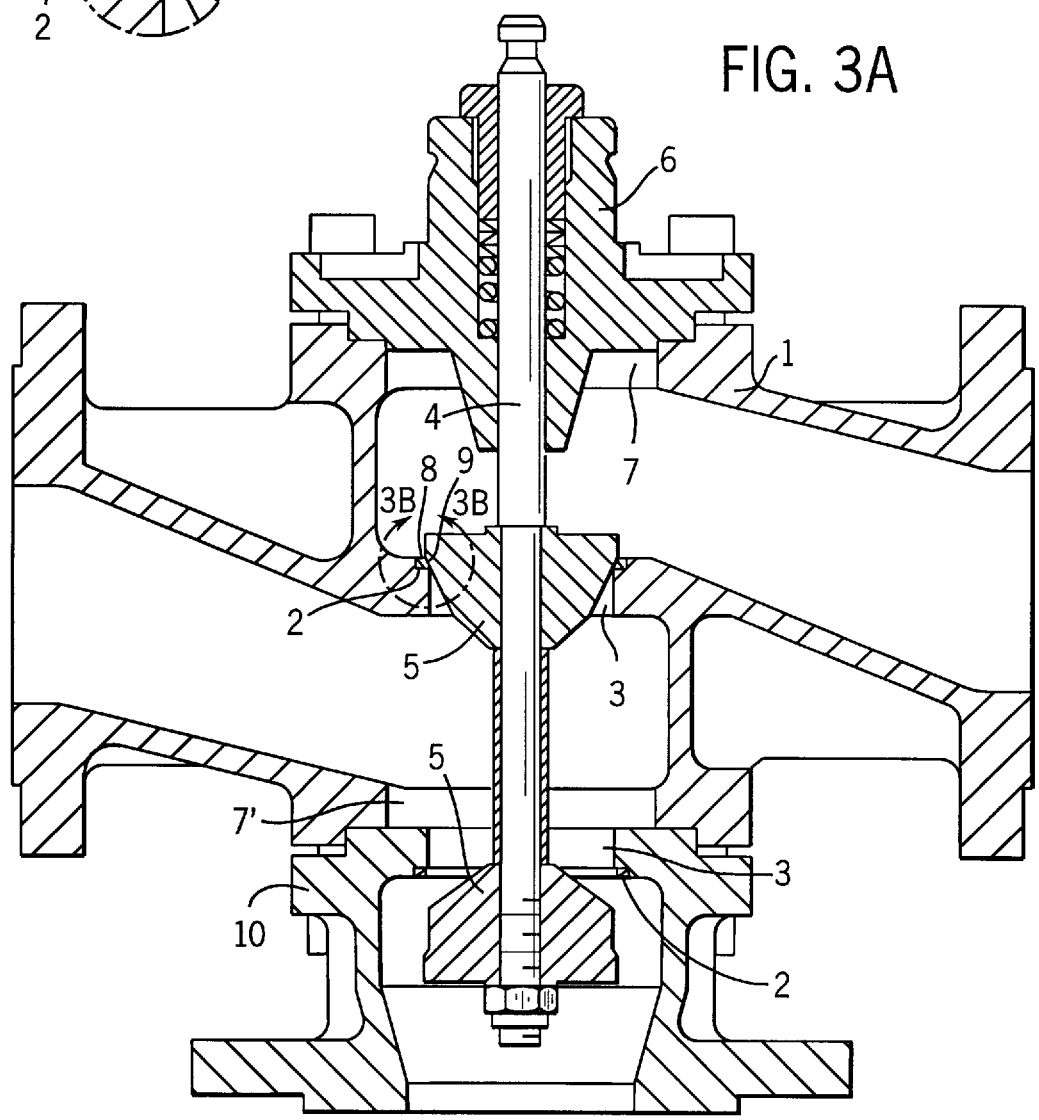

FIGS. 1 to 3 show series-produced valves for applications in heating, ventilation and air-conditioning systems. They are designed for a nominal pressure range of up to 40 bar and are used more particularly as water and steam valves. The basic construction of the valves shown in the drawings comprises a cast-iron valve body 1, at least one stainless steel valve seat 2 disposed in a flow restrictor opening 3 in the body 1, an actuating rod 4 with at least one flow restrictor 5, and a cover 6 which closes an opening 7 for it in the valve body 1, the opening 7 being in alignment with the valve seat 2. The actuating rod 4 is taken out through the cover 6 and is sealed therein.

The valve body 1 is produced from a casting serving as blank. The valve seat 2 is welded into the blank without any appreciable preliminary chip removal treatment of the casting surface. The blank is then finish-treated, the finishing treatment including external painting of the body 1. The blank is made of cast iron, a nodular graphite casting, more particularly of the quality GGG 40 or GGG 40.3, being preferred.

Figure 4:
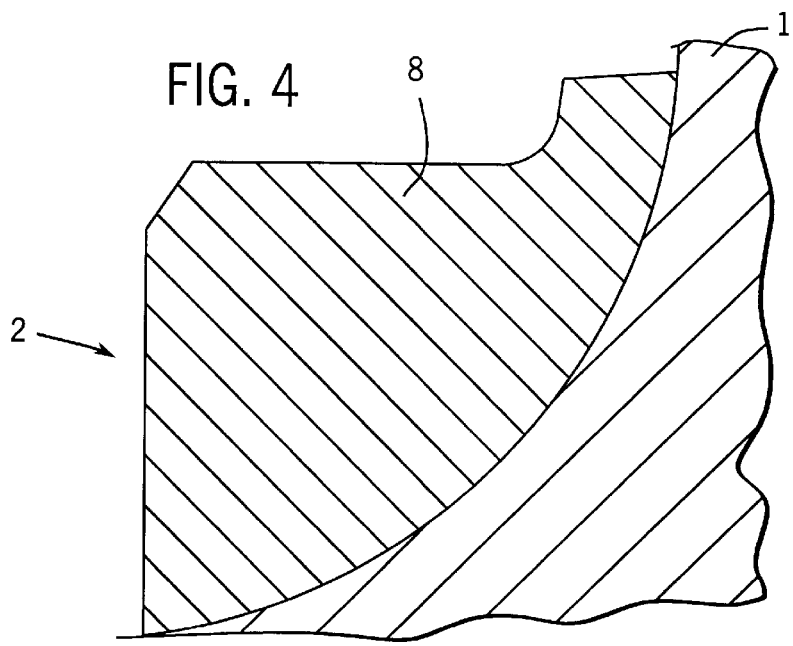
FIG. 4 is a detail to a highly enlarged scale of a valve seat produced by the process according to the invention.

In the valve constructions shown in FIGS. 1 to 3 the valve seat 2 consists of a sealing edge 8 produced by build-up welding. FIG. 4 is a detail to a highly enlarged scale of the edge 8. To produce the seat 2 or edge 8 a weld bead of a stainless material is first introduced by build-up welding into an annular groove 9 of the flow restrictor opening 3, such groove being open on the end face. The valve seat 2 is then finish-treated by shaping of the weld bead by chip removal. A high-alloy austenitic build-up material or a Stellite material is used for this purpose. The welding operations are performed by pulsed arc welding in a protective gas, a gas mixture which has argon as its main constituent and additions of $CO_2$ and oxygen being used as protective gas.

FIGS. 2 and 3 relate to multi-way valves produced by the process according to the invention. The cast-iron valve body 1 has two identical and aligned openings 7, 7' for the covers. One opening 7 is closed by a cover 6 in which the actuating rod 4 is guided. A cast-iron branch flange 10 is connected to the other opening 7' and also has a flow restrictor opening 3 and a stainless steel welded-in valve seat 2. The valve seat 2 is produced by build-up welding in the manner hereinbefore described. The weld bead is then finish-treated by shaping by chip removal.

Figure 5:
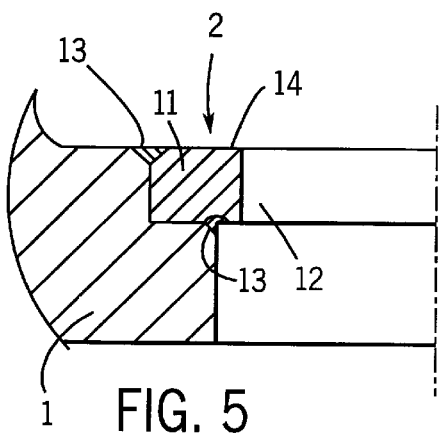
FIGS. 5 to 7 are details of alternative forms of the valve seat according to the invention.
Figure 6:
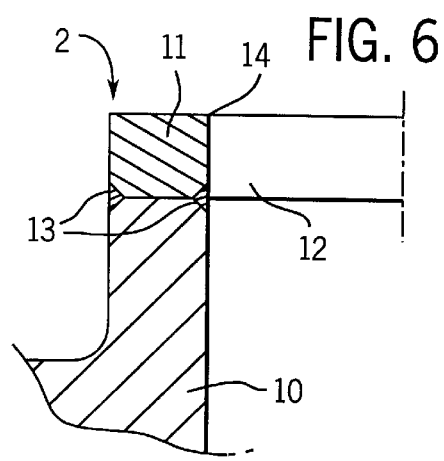
Figure 7:
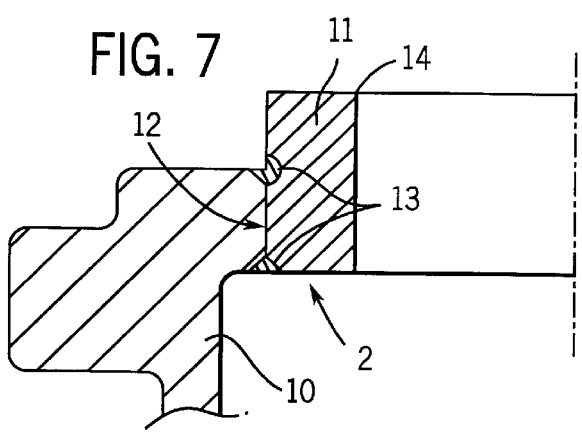

The invention also covers the welding of prefabricated stainless steel rings 11 into the flow restrictor opening 3 of the blank or of a branch flange 10. FIG. 5 is a detail of the valve seat 2 in the body flow restrictor opening 3. The prefabricated ring 11 is introduced into an annular groove 12 in the flow restrictor opening 3, such groove being open on the end face, and connected by weld beads 13 to the cast-iron valve body 1. FIGS. 6 and 7 show valve seat rings 11 for the branch flanges 10 of the multi-way valves shown in FIGS. 2 and 3. The ring 11 of FIG. 6 is for the valve type shown in FIG. 2 and the ring 11 of FIG. 7 is for the valve type of FIG. 3. The valve seat rings 11 are in all cases made of stainless steel, for example, 1.4305, and are connected by pulsed arc welding in a protective gas to the cast body of the flange 10. Alternatively, laser welding can be used. The rings 11 have a seat edge 14 serving as the valve seat for the flow restrictor.

EXAMPLE

A valve seat shown in FIG. 4 was produced by build-up welding in an annular groove, open on the end face, of a through bore of the cast valve body. The latter was made of GGG 40.3 nodular graphite iron. The following welding parameters were observed:

Welding material: Capilla 51 MSG 8-GZ (1.4370)
Protective gas: 90% Ar, 5% $O_2$, 5% $CO_2$
Current: 200–205 A
Voltage: 24–26 V
Wire feed: 7.2–7.5 m/min
Welding rate: 70 cm/min
Wire weight per pass: 25 g The weld bead was free from cracks and pores and could readily be machined by chip removal. A seat edge of accurate contour and providing satisfactory sealing tightness was produced.

I claim:

1. A process for producing series-produced valves which are used in heating, ventilating and air-conditioning systems and which comprise a cast-iron valve body, at least one stainless steel valve seat disposed in a flow restrictor opening in the body and an actuating rod having at least one flow restrictor, comprising the steps of:

taking out the actuating rod from the valve body through a cover which closes an opening for the cover in the valve body, such opening being in alignment with the valve seat, producing the valve body from a casting serving as a blank, assembling the actuating rod with the flow restrictor and the cover.

welding the valve seat into the casting serving as the blank without previous chip removal treatment of the casting surface, finish-treating the blank in one chucking.

2. A process according to claim 1 further comprising the step of providing a casting serving as blank which is made of cast iron.

3. A process according to claim 1 further comprising the step of using a blank which, after machining, has two identical openings for the covers in alignment with one another.

4. A process according to claim 1 further comprising the steps of introducing a stainless steel weld bead by build-up welding into an annular groove in the flow restrictor opening, such groove being open on the end face, and producing the valve seat by shaping of the weld bead by chip removal.

5. A process according to claim 4 further comprising the step of using a high-alloy austenitic chemically resistant build-up material is used.

6. A process according to claim 1 further comprising the step of welding a prefabricated stainless steel ring into the flow restrictor opening, the ring having a seat edge serving as valve seat for the flow restrictor.

7. A process according to claim 1 further comprising the step of performing the welding operations by pulsed arc welding in a protective gas, a gas mixture which has argon as its main constituent and additions of $CO_2$ and oxygen being used as protective gas.

8. A process according to claim 1 further comprising the step of performing the welding operations via laser welds.

9. The process as recited in claim 1 wherein welding the valve seat comprises forming the valve seat by building up a weld bead.

10. The process as recited in claim 9 further comprises shaping a surface of the weld bead to mate with the flow restrictor.

* * * * *